(12) United States Patent
Weir

(10) Patent No.: US 8,006,181 B2
(45) Date of Patent: *Aug. 23, 2011

(54) SYSTEM FOR HANDLING NOVEL WORDS IN A SPELLCHECKING MODULE

(75) Inventor: Robert Cameron Weir, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 394 days.

This patent is subject to a terminal disclaimer.

(21) Appl. No.: 12/171,485

(22) Filed: Jul. 11, 2008

(65) Prior Publication Data

US 2008/0270122 A1    Oct. 30, 2008

Related U.S. Application Data

(63) Continuation of application No. 10/900,896, filed on Jul. 28, 2004, now Pat. No. 7,430,716.

(51) Int. Cl.
*G06F 17/21* (2006.01)
*G06F 17/24* (2006.01)

(52) U.S. Cl. ............ 715/257; 704/10; 715/259

(58) Field of Classification Search ........... None
See application file for complete search history.

(56) References Cited

U.S. PATENT DOCUMENTS

| | | | | |
|---|---|---|---|---|
| 5,970,492 A * | 10/1999 | Nielsen | ........... | 1/1 |
| 6,192,333 B1 * | 2/2001 | Pentheroudakis | ........... | 704/10 |
| 6,708,311 B1 * | 3/2004 | Berstis | ........... | 715/206 |
| 6,918,086 B2 * | 7/2005 | Rogson | ........... | 715/257 |
| 7,254,773 B2 * | 8/2007 | Bates et al. | ........... | 715/256 |

* cited by examiner

*Primary Examiner* — Matthew J Sked
(74) *Attorney, Agent, or Firm* — Guerin & Rodriguez, LLP

(57) ABSTRACT

A system for adding words to an online dictionary used for spellchecking is described. A spellchecker module compares words of an electronic document with words in the online dictionary and identifies a word in the electronic document that is missing from the dictionary. After a user indicates a desire to add the missing word to the dictionary, the spellchecker module determines at least one related-word form of the missing word. The related-word forms depend upon the part of speech of the missing word. The spellchecker can prompt the user to identify the part of speech and then to verify each determined related-word form. The spellchecker concurrently adds the missing word and at least one related-word form of the missing word to the online dictionary in a single 'add-to-dictionary' operation.

17 Claims, 5 Drawing Sheets

SYSTEM FOR HANDLING NOVEL WORDS IN A SPELLCHECKING MODULE

CROSS-REFERENCE TO RELATED APPLICATION

This application is a continuation application claiming the benefit of the filing date of co-pending U.S. patent application Ser. No. 10/900,896, filed Jul. 28, 2004, titled "Enhanced Efficiency in Handling Novel Words in a Spellchecking Module," the entirety of which U.S. patent application is incorporated by reference herein.

FIELD OF THE INVENTION

The invention relates generally to spellchecking electronic documents. More specifically, the invention relates to a system and method for adding words to a dictionary used for spellchecking.

BACKGROUND

Many word processing programs have a function, called spellchecking, for verifying the correctness of the spelling of words in an electronic document. Common spellcheckers verify spelling by comparing words in the document with words in an online dictionary. Any word in the document that is missing from the dictionary the spellchecker fails to recognize and thus flags as misspelled. Sometimes the unrecognized word, however, is in fact correctly spelled, but its absence from the dictionary causes a misidentification. Product names, proper names of people and places, and technical terms are the usual types of words most frequently misidentified.

Upon encountering an unrecognized word, the spellchecker presents a user with three choices: 1) ignore the word; 2) correct the word; or 3) add the word to the dictionary. If the user adds the word to the dictionary, the spellchecker recognizes the word upon each subsequent encounter in the same or in a different document and considers it correctly spelled. Although this satisfies the spellchecker for one particular form of the word, other forms of the same word, however, still cause the spellchecker to present the user with the above-described three choices.

For example, consider the following text in quotations: "An elastomer is a polymer material that recovers its original shape upon release of a deforming stress. This elasticity distinguishes elastomers from plastics. An elastomer's properties make such material suitable for many different products. For example, golf ball covers are commonly made of elastomeric material." When a spellchecker analyzes this text, the word "elastomer" is flagged as misspelled (i.e., unrecognized). Despite the addition of elastomer to the dictionary, however, the spellchecker still flags the related-word forms "elastomers" (plural), "elastomer's" (possessive), and "elastomeric" (adjective) as misspelled because each of these words remains unrecognizable. This occurs because only the particular form added to the dictionary is considered valid. Each new related-word form is consequently flagged as misspelled and thus needs to be individually added to the dictionary. Consequently, running a spellchecker on a technical document, which often uses many variations of technical terms and proper nouns, can be particularly bothersome if the user needs to pause and add each variation of a related-word form as each related-word form is encountered.

SUMMARY

In one aspect, the invention features a method for adding words to an online dictionary used for spellchecking. Spellchecking is performed on an electronic document by comparing words of the electronic document with words in the online dictionary. An unrecognized word in the electronic document is identified and at least one related-word form of the unrecognized word is determined. The unrecognized word and at least one related-word form of the unrecognized word are concurrently added to the online dictionary in a single operation.

In another aspect, the invention features a computing system comprising a processor executing an application program for working with an electronic document and an online dictionary having a plurality of words. A spellchecker module includes a comparator module for identifying a word in the electronic document that is missing from the online dictionary. The computing system also includes means for providing at least one related-word form of the missing word. The spellchecker module concurrently adds the missing word and at least one related-word form of the missing word to the online dictionary in a single operation.

In another aspect, the invention features an apparatus for adding words to an online dictionary used for spellchecking. The apparatus includes means for performing spellchecking on an electronic document, means for identifying an unrecognized word in the electronic document, means for determining at least one related-word form of the unrecognized word, and means for concurrently adding the unrecognized word and at least one related-word form of the unrecognized word to the online dictionary in a single operation.

In still another aspect, the invention features a computer program product for use with a computer system. The computer program product comprises a computer useable medium having embodied therein program code comprising program code for performing spellchecking on an electronic document, program code for identifying an unrecognized word in the electronic document, program code for producing at least one related-word form of the unrecognized word, and program code for concurrently adding the unrecognized word and at least one related-word form of the unrecognized word to the online dictionary in a single operation.

In yet another aspect, the invention features a computer data signal embodied in a carrier wave for use with a computer system having a display and capable of generating a user interface through which a user may interact with the computer system. The computer data signal comprises program code for performing spellchecking on an electronic document, program code for identifying an unrecognized word in the electronic document, program code for producing at least one related-word form of the unrecognized word, and program code for concurrently adding the unrecognized word and at least one related-word form of the unrecognized word to the online dictionary in a single operation.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

The present invention enables a user to perform a single "add-to-dictionary" operation that concurrently adds multiple related words to an online dictionary used by a spellchecker. As used herein, online means that the contents of the dictionary are electronically stored on a computing system. During a spellchecking session, when a user wants to add a new word to the online dictionary, the spellchecker of the invention produces various related-word forms of that word and presents an opportunity for the related-word forms and the new word to be added to the dictionary concurrently. Thus, the spellchecker spares the user from having to pause and add each related-word form separately to the dictionary whenever the spellchecker encounters a new variation. In general, any desktop word processing application or any other software that performs interactive spellchecking of documents can be used to practice the invention.

Figure 1:
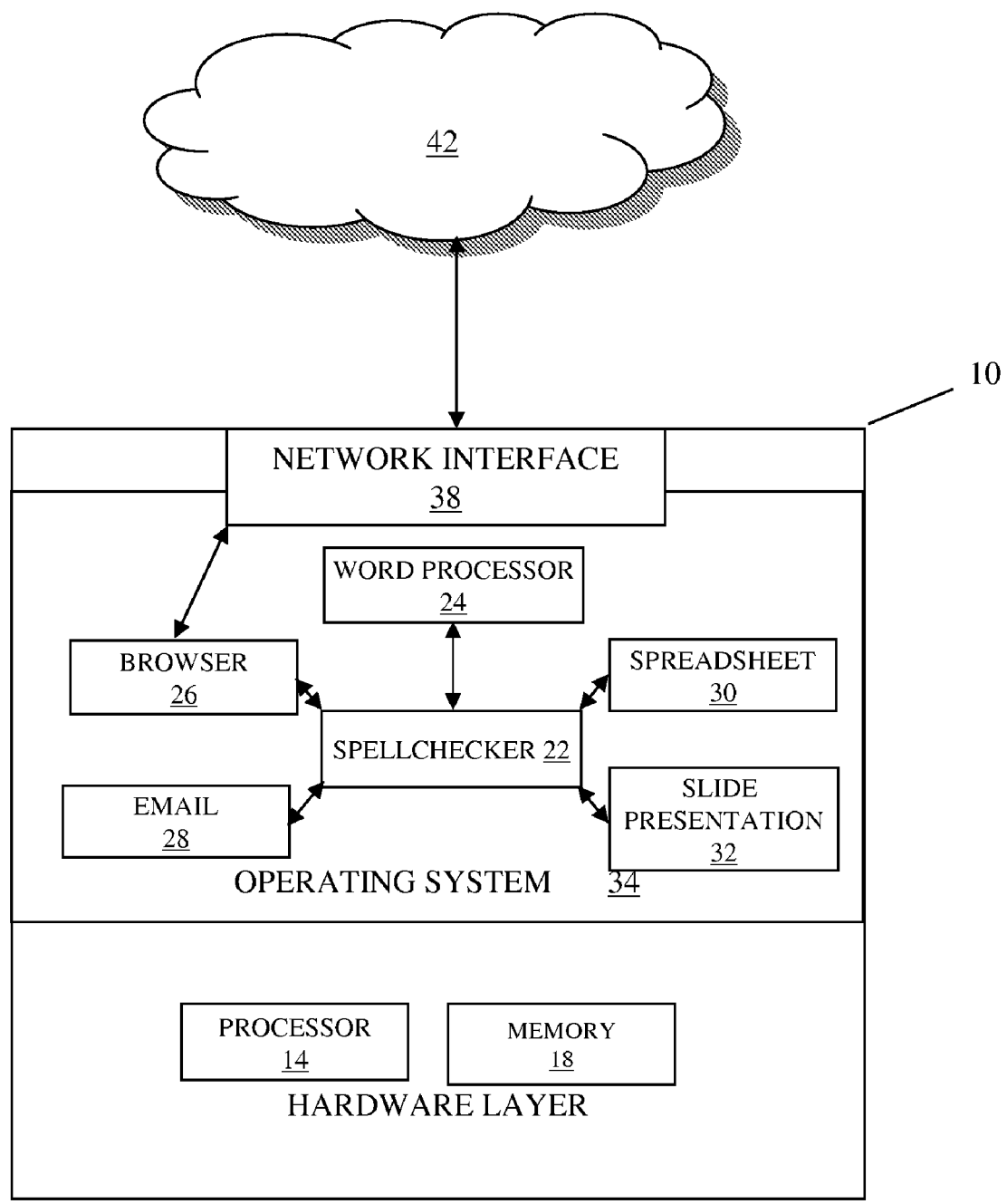
FIG. 1 is a block diagram of an embodiment of a computing system having a spellchecking module of the present invention.

FIG. 1 shows an embodiment of a client computing system 10 constructed in accordance with the invention. In general, the client computing system 10 is a computing device having a processor 14, a user interface, a display screen, an input device (e.g., keyboard, a mouse, trackball, touch-pad, touch-screen, etc), and persistent storage 18 for storing data and software programs. Exemplary embodiments of the client computing system 10 include, but are not limited to, a personal computer (PC), a Macintosh computer, a workstation, laptop computer, a mainframe computer, and a hand-held device such as a personal digital assistant (PDA) and a cellular phone.

One program stored in the persistent storage 18 is a spellchecking module 22 of the invention (hereafter, spellchecker 22). Application programs stored at the client computing system 10 include, but are not limited to, a word processing program 24, browser software 26, an email program 28, a spreadsheet program 30, and presentation software 32 such as MICROSOFT POWERPOINT™. Any one or all of these application programs can be adapted to interface with the spellchecker 22 of the invention, as described herein, to implement spellchecking for documents handled by that application program. In other embodiments, any one or more of the application programs can have its own integrated spellchecker embodied therein.

The spellchecker 22 and application programs run on an operating system 34. The operating system 34 of the client computing system 10 can be one of a variety of platforms including, but not limited to, WINDOWS 98, WINDOWS NT 4.0, WINDOWS XP, PALM OS, Macintosh, JAVA, LINUX, UNIX, and WINDOWS CE for windows-based terminals. The client computing system 10 can also includes a network interface 38 for communicating over a network 42. The network 42 can be a local-area network (LAN), a metro-area network (MAN), or wide-area network (WAN), such as the Internet or World Wide Web. Users of the client computing system 10 can connect to the network 42 through one of a variety of connections, such as standard telephone lines, LAN or WAN links (e.g., T1, T3), broadband connections (Frame Relay, ATM), and wireless connections (e.g., 802.11(a), 802.11(b), 802.11(g)).

In an alternative embodiment, the client computing system 10 is any terminal (windows or non-windows based), or thin-client device operating according to a server-based computing model. In a server-based computing model, the execution of the spellchecker 22 and the application programs 24, 26, 28, 30, and 32 occurs entirely on an application server (not shown), and the user interface, keystrokes, and mouse movements are transmitted over the network 42 to the client computing system 10. The user interface can be text driven (e.g., DOS) or graphically driven (e.g., Windows).

Figure 2:
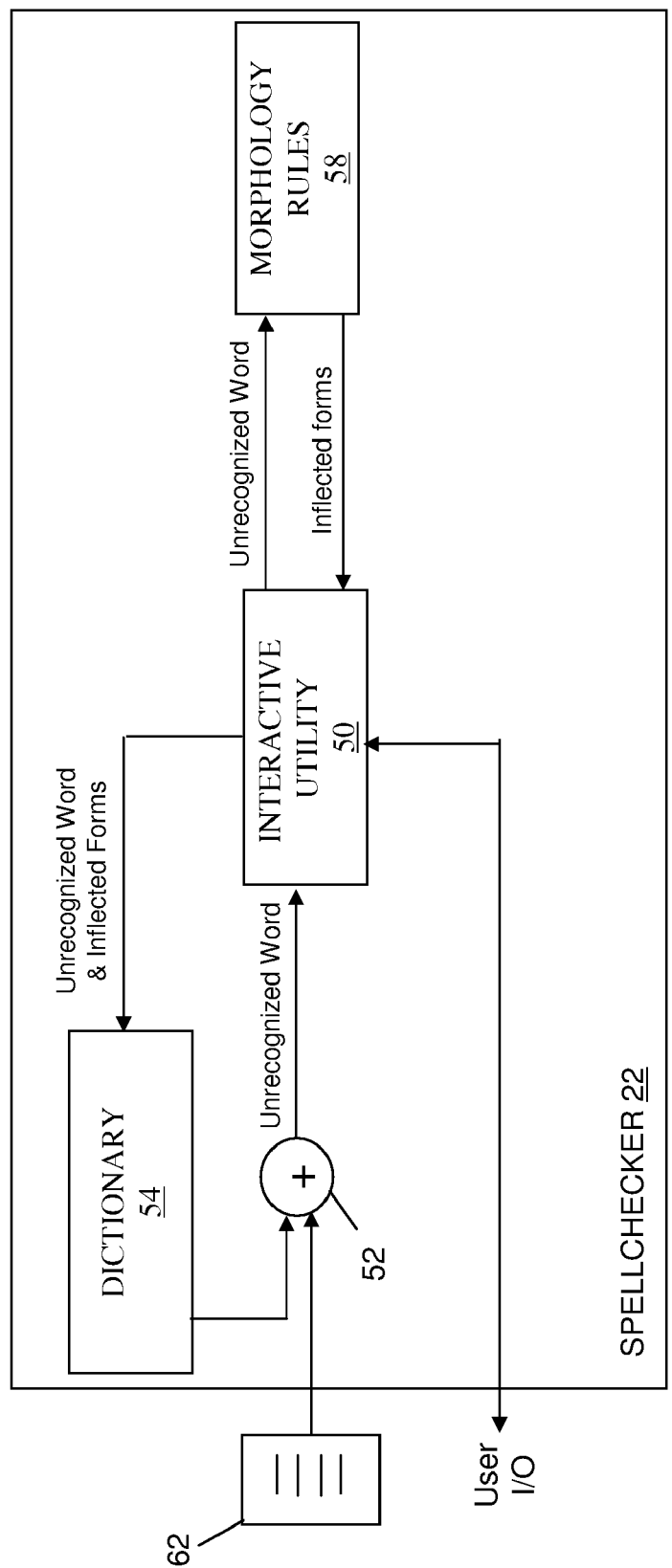
FIG. 2 is a block diagram of an embodiment of the spellchecking module of the invention.

FIG. 2 shows one exemplary embodiment of the spellchecker 22 of FIG. 1. The spellchecker 22 includes an interactive utility (or wizard) 50, a comparator 52, a dictionary 54, and, optionally, a rules of language morphology module 58 (hereafter, morphology rules module 58). Although shown to be integrated in the spellchecker 22, the dictionary 54 and morphology rules module 58 can each be a separate software component external to the spellchecker 22.

The interactive utility 50 includes program code for leading the user through each step for completing a spellchecking session. The comparator 52 includes program code for obtaining individual words from an electronic document 62 and comparing those words with the words in the dictionary 54. The plurality of words in the dictionary 54 represents correctly spelled words for a particular language, such as English, German, and French. The electronic document 62 can be a text file, web page, spreadsheet, slide presentation, or have any format provided that the words in the document 62 can be delineated for parsing and comparing with words in the dictionary 54. The comparator 52 is in communication with the interactive utility 50 to notify the interactive utility 50 of each word of the document not found in the dictionary 54. Such words are referred to herein interchangeably as unrecognized words, missing words, and misspelled words.

The morphology rules module 58 comprises a set of rules for determining one or more related-word forms for an unrecognized word. For example, a morphology rule for producing, in the English language, a possessive form from a singular noun is to add an apostrophe-s ('s) to the end of the noun. Exceptions to this rule can be handled by other morphology rules. Related-word forms are determined according to the morphosyntactic operations of a given language. Examples of morphosyntactic operations for the English language include inflection and derivation. An inflection of word preserves the part of speech. For example, a morphosyntactic operation that produces a noun from a noun is an inflection (such as "elastomers" from "elastomer"). A derivation of a word produces a new part of speech. For example, a morphosyntactic operation that produces an adjective from a noun is a derivation (such as "elastomeric" from "elastomer").

Different embodiments of the morphology rules module 58 can produce related-word forms that range in number, from one to many different related-word forms. Different embodiments can also produce different types of related-word forms for a given word. The type of related-word form can depend upon the particular language handled by the spellchecker 22 (the principles of the invention apply to any language, natural or artificial), and upon the particular part of speech (e.g., noun, verb) of that word.

The morphology rules module 58 is in communication with the interactive utility 50 to receive each unrecognized word for which at least one related-word form is desired (and, optionally, the part of speech of the unrecognized word) and to return each determined related-word form to the interactive utility 50. The interactive utility 50 is in communication with the dictionary 54 for providing the unrecognized word and each related-word form that is to be added to the dictionary 54.

Figure 3:
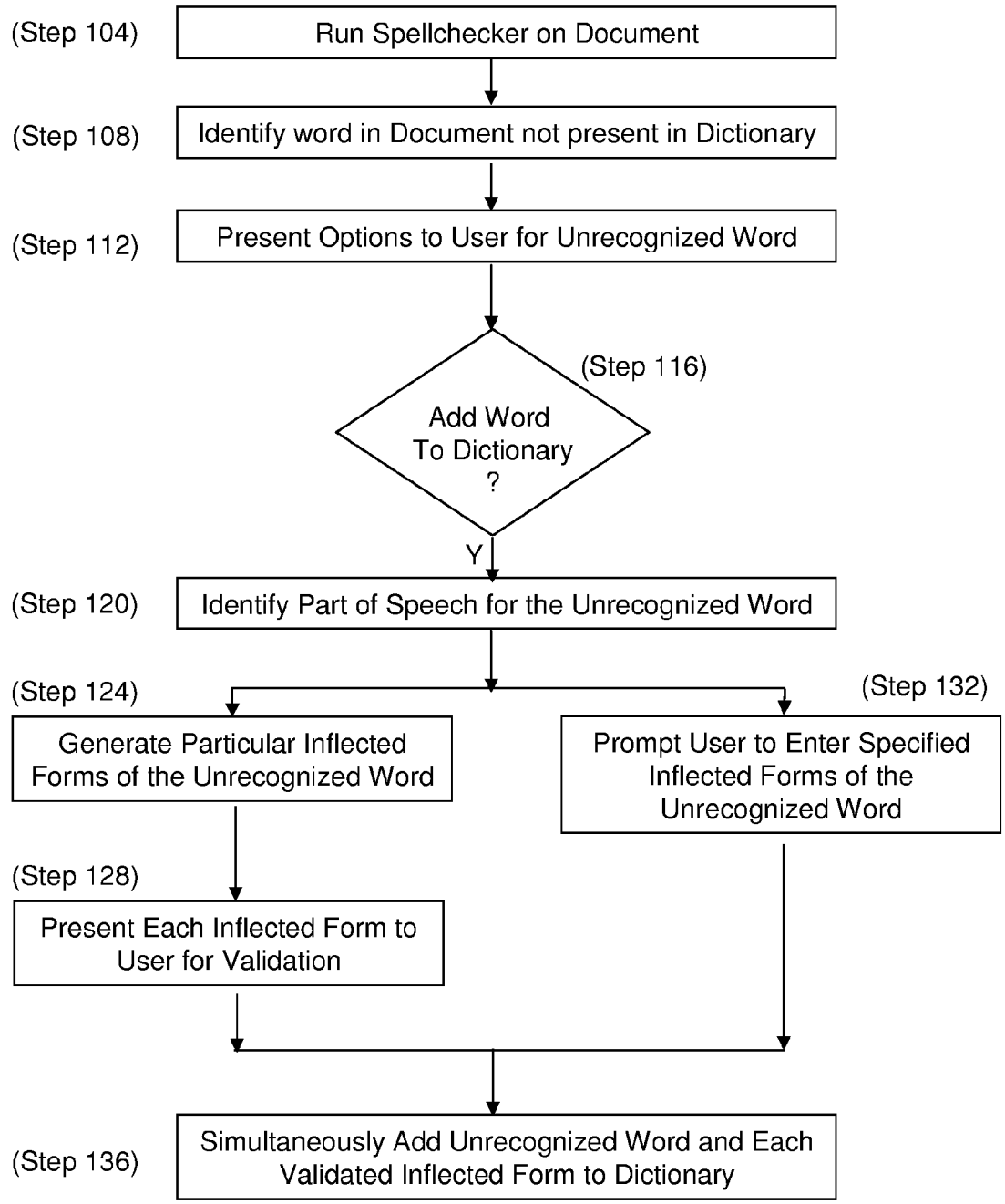
FIG. 3 is an embodiment of a process for adding words to a dictionary of a spellchecking module.

FIG. 3 shows an embodiment of a process 100 for spellchecking a document and for adding words to the dictionary 54 for use in subsequent spellchecking. In the description of the process 100, reference is also made to FIG. 2. The spellchecker 22 executes (step 104) upon an electronic document 62. Spellchecking can be configured to execute as the user enters text into the document. Alternatively, the user can deliberately run the spellchecker 22 at any point in the generation or editing of the document 62. At step 108, the spellchecker 22 identifies a word that is not in the dictionary 54. The unrecognized word may appear bolded and colored or an indicator may appear under the unrecognized word to alert the user of a possible misspelling. Among other options, the interactive utility 50 of the spellchecker 22 presents (step 112) the user with a choice of adding the unrecognized word to the dictionary 54 (i.e., to perform an "add-to-dictionary" operation).

When the user chooses (step 116) to add the unrecognized word to the dictionary 154, the interactive utility 50 prompts (step 120) the user to identify the part of speech for the unrecognized word (e.g., noun, verb, adjective, or adverb). Based on the identified part of speech, in one embodiment the morphology rules module 58 automatically generates (step 124) one or more particular related-word forms of the unrecognized word, which are then presented (step 128) to the user for validation. The user can decide which of the automatically generated related words are invalid, and disable such words from being added to the dictionary 54.

In an alternative embodiment, the user is prompted (step 132) to supply specified related-word forms, which the user manually enters in certain locations reserved on the display screen for receiving the information. The user can choose which related word to provide, preferably providing words for valid related-word forms only.

After the user has either validated the automatically generated related-word forms, or manually supplied words for certain specified related-word forms, the spellchecker 22 concurrently adds (step 136) the unrecognized word and each selected related-word form of the unrecognized word to the dictionary 54. Accordingly, the user can concurrently add multiple words to the dictionary 54 in a single "add-to-dictionary" operation, thus potentially reducing the inconvenience of further spellchecking the document.

Figure 4:
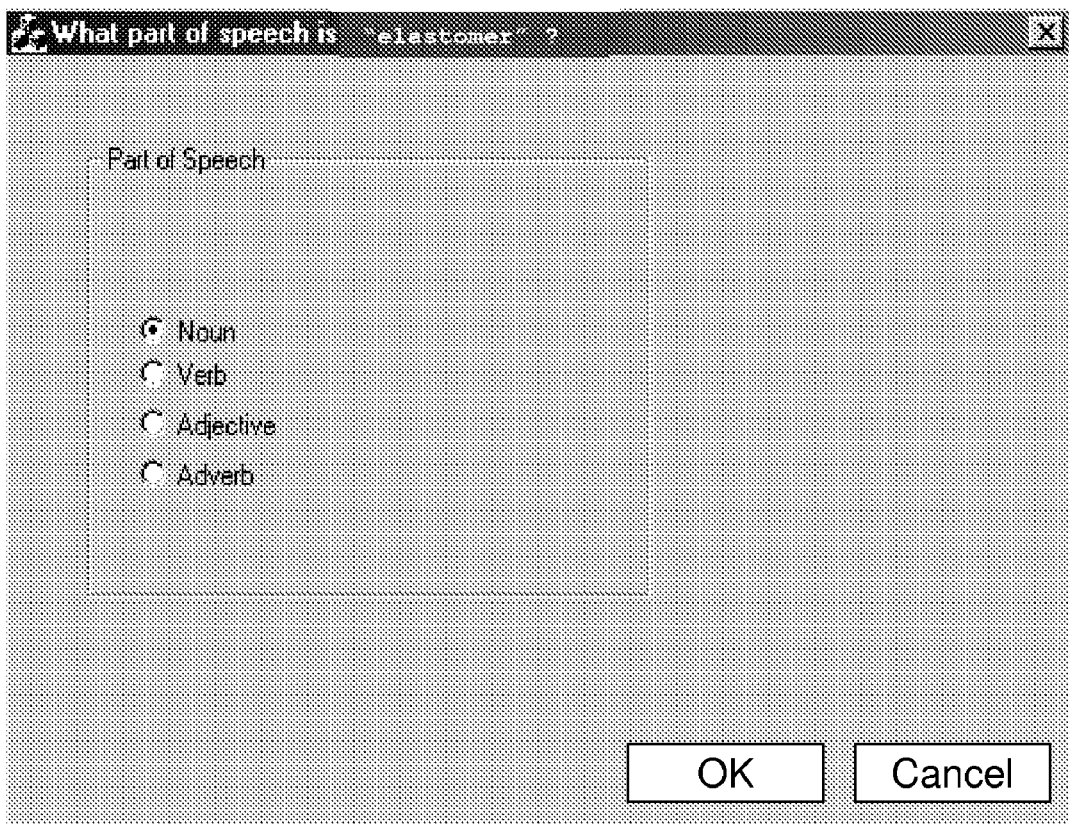
FIG. 4 is an embodiment of a dialog box prompting a user to provide a part of speech for a word flagged by the spellchecking module as misspelled (or unrecognized).

Consider, for example, that the spellchecker 22 detects an unrecognized word, "elastomer". After the user has indicated a desire to add this word to the dictionary 54, the interactive utility 50 displays a dialog window, such as dialog box shown in FIG. 4, which prompts the user for the grammatical category (i.e., part of speech) for the word. To assist the user, four categories appear: noun, verb, adjective, and adverb. Other embodiments can present different types and different numbers of categories than those shown. The appearance, types of categories, manner of receiving user input, and the like of the dialog box of FIG. 4 are merely exemplary. Other interactive means can be used to induce the user to identify the part of speech.

Figure 5:
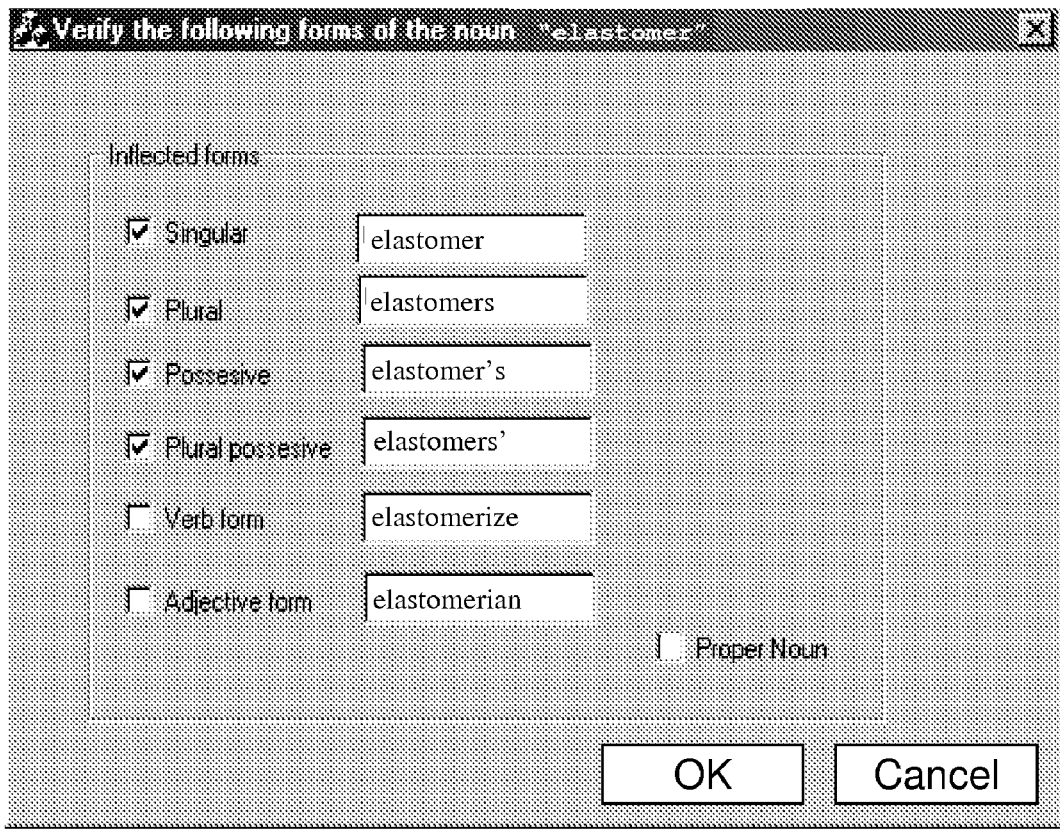
FIG. 5 is an embodiment of a dialog box prompting a user to verify each related-word form of the misspelled word that the user wants to be added to the dictionary.

FIG. 5 shows another dialog box produced after the user identifies the unrecognized word as a noun. The dialog box specifies certain related-word forms including, for example, singular, plural, possessive, plural possessive, adjective form, and a verb form. These related-word forms are exemplary; different types and different numbers of choices than those shown can be provided. For example, for highly inflected languages, such as German, additional choices can include an accusative, dative, and genitive forms. The unrecognized word can appear in the list of related-word forms.

Words for each of these related-word forms may be automatically generated by the morphology rules module 58, or manually supplied by the user. The dialog box also prompts the user to indicate whether the noun is a proper noun. The user can select which related-word forms to add to the dictionary, e.g., by checking the appropriate provided checkbox. Unselecting a related-word form invalidates the default word. For example, in FIG. 5, the adjective and verb forms are unselected because the user determines that the words, here provided by the morphology rules module, are invalid. Instead of unselecting a related-word form, the user can edit the provided words. For example, the user can manually change the adjective form from elastomerian to elastomeric. When satisfied with the set of related-word forms to be added to the dictionary 54, the user signals acceptance (clicks the OK button), to complete the "add-to-dictionary" operation.

As another example, consider the verb "akamaize." After the part of speech is identified as a verb, the interactive utility 50 of the spellchecker 22 can prompt the user to verify several related-word forms of this word similarly to that described above for a noun. Examples of provided related-word forms include first person (akamaize), third person (akamaizes), past tense (akamaized), present and past participles (akamaizing and akamaized). After the user verifies the various valid related-word forms, all selected words are added to the dictionary in a single operation.

In the examples described above, the user interacts with the spellchecker 22 to determine the related words that are added to the dictionary. Some embodiments reduce or remove user interaction after the user indicates a desire to add the unrecognized word to the dictionary. For instance, software can be used to determine automatically the part of speech from, for example, the position and context of the unrecognized word in a sentence. In this instance, the spellchecker 22 does not need to prompt the user to identify the part of speech for the unrecognized word. As another instance, the spellchecker can automatically add the related-word forms generated by the morphology rules module 58 to the dictionary 54 without prompting the user to verify those related-word forms. With a combination of these above-described automatic capabilities, after the user indicates intent to add the unrecognized word to the dictionary, a spellchecker can automatically identify the part of speech, generate the related-word forms, and add the related-word forms to dictionary without any further interaction with the user.

The present invention may be implemented as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPROM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA, BASIC, Visual Basic, and Visual C++. The software programs may be stored on or in one or more articles of manufacture as source code, object code, interpretive code, or executable code.

Although the invention has been shown and described with reference to specific preferred embodiments, it should be understood by those skilled in the art that various changes in form and detail may be made therein without departing from the spirit and scope of the invention as defined by the following claims. For example, the appearance of the dialog windows can be modified in various ways, e.g., to appeal to a non-grammarian user, with resulting hints, examples, and with attention given to not overwhelming such user with unnecessary options.

What is claimed is:

1. A computing system, comprising:
    a processor executing an application program for working with an electronic document;
    an online dictionary having a plurality of words;
    a spellchecker module having a comparator module for identifying a word in the electronic document that is missing from the online dictionary; and
    means for determining at least one related-word form of the missing word, wherein the spellchecker module concurrently adds the missing word and at least one related-word form of the missing word to the online dictionary in a single operation.

2. The computing system of claim 1, wherein the means for determining at least one related-word form of the word includes a language morphology rules module that automatically determines each related-word form from the missing word according to a predefined set of rules.

3. The computing system of claim 1, wherein the means for determining at least one related-word form of the missing word determines each type of related-word form based on a part of speech of the missing word.

4. The computing system of claim 3, further comprising an interactive utility for prompting the user to identify the part of speech of the missing word.

5. The computing system of claim 4, wherein the user is prompted to select the part of speech from one of a noun, verb, adjective, and adverb.

6. The computing system of claim 1, further comprising an interactive utility for prompting a user to verify each related-word form before that related-word form is added to the dictionary.

7. The computing system of claim 1, further comprising an interactive utility for receiving from a user an indication of a desire to add the missing word to the online dictionary, and wherein the means for providing at least one related-word form operates after the user provides said indication.

8. An apparatus for adding words to an online dictionary used for spellchecking, the apparatus comprising:
    means for performing spellchecking on an electronic document;
    means for identifying an unrecognized word in the electronic document;
    means for determining at least one related-word form of the unrecognized word; and
    means for concurrently adding the unrecognized word and at least one related-word form of the unrecognized word to the online dictionary in a single operation.

9. The apparatus of claim 8, further comprising means for identifying a part of speech for the unrecognized word and wherein the means for determining includes means for determining each related-word form based on the identified part of speech.

10. The apparatus of claim 9, wherein the means for identifying a part of speech of the unrecognized word includes means for prompting a user to select one of a noun, verb, adjective, and adverb.

11. The apparatus of claim 8, further comprising means for prompting a user to verify each related-word form before adding that related-word form to the online dictionary.

12. The apparatus of claim 8, further comprising means for receiving an indication that a user wants to add the unrecognized word to the online dictionary, and wherein the determining means determines at least one related-word form in response to the receiving means receiving an indication that a user wants to add the unrecognized word to the online dictionary.

13. A non-transitory computer-readable storage medium having computer-readable instructions stored thereon for execution by a processor of a computing system to perform a method comprising:
    performing spellchecking on an electronic document by comparing words of the electronic document with words in an online dictionary;
    identifying an unrecognized word in the electronic document;
    determining at least one related-word form of the unrecognized word; and
    concurrently adding the unrecognized word and at least one related-word form of the unrecognized word to the online dictionary in a single operation.

14. The non-transitory computer-readable storage medium of claim 13, further comprising computer-readable instructions stored thereon for execution by the processor to identify a part of speech for the unrecognized word and wherein each related-word form of the unrecognized word is based on the identified part of speech.

15. The non-transitory computer-readable storage medium of claim 14, wherein the computer-readable instructions for execution by the processor to identify a part of speech of the unrecognized word include computer-readable instructions for execution by the processor to prompt a user to select one of a noun, verb, adjective, and adverb.

16. The non-transitory computer-readable storage medium of claim 13, further comprising computer-readable instructions stored thereon for execution by the processor to prompt a user to verify each related-word form of the unrecognized word before adding that related-word form to the online dictionary.

17. The non-transitory computer-readable storage medium of claim 13, further comprising computer-readable instructions stored thereon for execution by the processor to receive an indication that a user wants to add the unrecognized word to the online dictionary, and wherein the determining of at least one related-word form occurs in response to receiving the indication.

* * * * *